United States Patent
Seo et al.

(10) Patent No.: US 12,438,691 B2
(45) Date of Patent: Oct. 7, 2025

(54) METHOD AND APPARATUS FOR PROCESSING SIGNAL IN WIRELESS COMMUNICATION SYSTEM

(71) Applicants: SAMSUNG ELECTRONICS CO., LTD., Suwon-si (KR); UIF (UNIVERSITY INDUSTRY FOUNDATION), YONSEI UNIVERSITY, Seoul (KR)

(72) Inventors: Bongsung Seo, Suwon-si (KR); Kwangsoon Kim, Seoul (KR); Jonghyun Kim, Seoul (KR); Kwanghoon Lee, Seoul (KR); Euiwhan Jin, Seoul (KR)

(73) Assignees: Samsung Electronics Co., Ltd., Suwon-si (KR); UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 18/479,535

(22) Filed: Oct. 2, 2023

(65) Prior Publication Data

US 2024/0129103 A1 Apr. 18, 2024

(30) Foreign Application Priority Data

Oct. 4, 2022 (KR) .................. 10-2022-0126634

(51) Int. Cl.
*H04L 7/00* (2006.01)
*H04B 17/29* (2015.01)
*H04B 17/336* (2015.01)

(52) U.S. Cl.
CPC .......... *H04L 7/0054* (2013.01); *H04B 17/29* (2015.01); *H04B 17/336* (2015.01)

(58) Field of Classification Search
CPC .... H04B 10/541; H04B 10/40; H04B 10/516; H04B 10/616; H04B 10/61; H04B 1/3827;
(Continued)

(56) References Cited

U.S. PATENT DOCUMENTS 7,301,486 B2 11/2007 Wang et al.
7,817,747 B2 10/2010 Waheed et al.
(Continued)

OTHER PUBLICATIONS

Chang et al., "A 28-nm 10-b 2.2-GS/s 18.2-mW Relative-Prime Time-Interleaved Sub-Ranging SAR ADC With On-Chip Background Skew Calibration," IEEE Journal Of Solid-State Circuits, vol. 56, No. 9, Sep. 2021, 10 pages.

*Primary Examiner* — Eva Y Puente

(57) ABSTRACT

The disclosure relates to a 5G or 6G communication system for supporting a higher data transmission rate than 4G communication systems such as LTE systems. A method performed by a user equipment (UE) in a wireless communication system may comprise receiving a signal, converting the signal into a digital signal, receiving, from a base station, transmission spectrum information for the UE and information for a time window, estimating a timing skew and a reception signal-to-noise ratio (SNR) of the digital signal based on the information for the time window and the transmission spectrum information, and compensating for a distortion of the digital signal based on the estimated timing skew and the reception SNR.

20 Claims, 6 Drawing Sheets

(58) Field of Classification Search
CPC ........ H04B 1/40; H04B 15/04; H04B 7/0482;
H04L 27/2647; H04L 27/3483; H04L
27/2626; H04L 1/0041; H04L 1/0045;
H04L 1/0071; H04L 27/2665; H04L
27/2662; H04W 56/0015; H04W 88/085;
H04W 4/023; H04W 4/40; H04W 16/20;
H04W 56/001; H04W 4/021; H04W
56/0035

See application file for complete search history.

(56) References Cited

U.S. PATENT DOCUMENTS

| | | | |
|---|---|---|---|
| 8,604,954 B2* | 12/2013 | Chen | H03M 1/1009 |
| | | | 341/120 |
| 8,890,739 B2 | 11/2014 | Lewis et al. | |
| 9,030,340 B1* | 5/2015 | Waltari | H03M 1/1245 |
| | | | 341/120 |
| 9,270,291 B1* | 2/2016 | Parnaby | H04B 17/21 |
| 9,543,976 B2* | 1/2017 | Miki | H03M 1/0836 |
| 9,608,652 B2* | 3/2017 | Lee | H03M 1/0836 |
| 11,641,210 B1* | 5/2023 | Lok | H03M 1/0836 |
| | | | 341/120 |
| 2006/0238397 A1* | 10/2006 | Nairn | H03M 1/0626 |
| | | | 341/155 |
| 2016/0079994 A1 | 3/2016 | Lee et al. | |
| 2023/0387934 A1* | 11/2023 | Zhao | H03M 1/14 |
| 2024/0137034 A1* | 4/2024 | Gupta | H03M 1/0836 |

\* cited by examiner

METHOD AND APPARATUS FOR PROCESSING SIGNAL IN WIRELESS COMMUNICATION SYSTEM

CROSS-REFERENCE TO RELATED APPLICATIONS

This application is based on and claims priority under 35 U.S.C. § 119 to Korean Patent Application No. 10-2022-0126634, which was filed in the Korean Intellectual Property Office on Oct. 4, 2022, the entire disclosure of which is incorporated herein by reference.

BACKGROUND

1. Field

The disclosure relates to a method and apparatus for processing signals in a wireless communication system and, more particularly, to a method for efficiently processing signals to obtain a wider sampling bandwidth and higher signal quality.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Broadband high-speed communication using a terahertz band required in, e.g., 6G requires both a broad sampling bandwidth of a few tens of GHz in the baseband and high signal quality for using a high-order modulation scheme of the 16 K-QAM or 64 K-QAM grade. Therefore, to support a sampling bandwidth of several tens of GHz, the user equipment (UE), in the conventional ADC technology, obtains a broad sampling bandwidth and high signal quality using a parallel-structure ADC, such as a time-interleaved ADC (TI-ADC) structure, and conventional model signal processing may receive the output signal of the parallel-structure ADC, as it is, and perform conventional signal processing, e.g., synchronization and modulation.

In the conventional ADC, however, a timing skew occurs between sub ADCs, significantly deteriorating the signal quality of the ADC output signal. Thus, high-order modulation requires reducing the timing skew to a very low level relative to the sampling interval. However, the conventional ADC technique alone additionally implements an analog or digital circuit for timing skew calibration, which may cause additional power consumption and further increase the sampling bandwidth. Thus, as the sampling interval reduces, it is more difficult to implement the circuit.

SUMMARY

According to an embodiment, a method performed by a user equipment (UE) in a wireless communication system may comprise receiving a signal, converting the signal into a digital signal, receiving transmission spectrum information for the UE and information for a time window from a base station, estimating a timing skew and a reception signal-to-noise ratio (SNR) of the digital signal based on the information for the time window and the transmission spectrum information, and compensating for a distortion of the digital signal based on the estimated timing skew and the reception SNR.

According to an embodiment, converting the signal into the digital signal may include converting the signal into the digital signal using a parallel-structure analog-to-digital converter (ADC).

According to an embodiment, estimating the timing skew and the reception SNR of the digital signal may include identifying an operation for measuring an autocorrelation and an autocorrelation model based on the transmission spectrum information, measuring the autocorrelation of the digital signal based on the operation for measuring the autocorrelation, and estimating the timing skew and the reception SNR of the digital signal based on the autocorrelation model and the measured autocorrelation of the digital signal.

According to an embodiment, estimating the timing skew and the reception SNR based on the measured autocorrelation of the digital signal may include estimating the timing skew and the reception SNR using a maximum likelihood (ML) estimation scheme or a gradient descent scheme.

According to an embodiment, the transmission spectrum information may be determined based on at least one of a time variance of the UE and scheduling information or waveform information for the base station.

According to an embodiment, the waveform information may include at least one of a number of samples per waveform, a fast Fourier transform (FFT) size, a cyclic prefix (CP) length, a multicarrier interval, a number of transmission multicarriers, a power distribution per transmission carrier, a pulse-shaping filter, or an interpolation filter.

According to an embodiment, compensating for the distortion of the digital signal based on the estimated timing skew and reception SNR may include compensating for the distortion of the digital signal through a timing skew compensation filter. The timing skew compensation filter may be a filter designed based on a minimum mean square error (MMSE).

According to an embodiment, a method performed by a base station in a wireless communication system may comprise generating transmission spectrum information about each of at least one UE, generation a time window for the at least one UE, and transmitting the time window and the transmission spectrum information to each of the at least one UE, wherein the information for the time window and the transmission spectrum information are used to estimate a timing skew and a reception signal-to-noise ratio (SNR) of the digital signal, and wherein the estimated timing skew and the reception SNR are used to compensate for a distortion of the digital signal.

According to an embodiment, a user equipment (UE) in a wireless communication system may comprise a transceiver and at least one processor. The at least one processor may be configured to receive a signal, convert the signal into a digital signal, receive transmission spectrum information about the UE and information for a time window from a base station, estimate a timing skew and a reception signal-to-noise ratio (SNR) of the digital signal based on the information for the time window and the transmission spectrum information, and compensate for a distortion of the digital signal based on the estimated timing skew and the reception SNR.

According to an embodiment, a base station in a wireless communication system may comprise a transceiver and at least one processor. The at least one processor may be configured to generate transmission spectrum information about each of at least one UE, generate a time window for the at least one UE, and transmit the time window and the transmission spectrum information, wherein the information for the time window and the transmission spectrum information are used to estimate a timing skew and a reception signal-to-noise ratio (SNR) of the digital signal, and wherein the estimated timing skew and the reception SNR are used to compensate for a distortion of the digital signal.

Various embodiments may provide a method and apparatus for allowing a modem, capable of efficiently performing digital signal processing, to perform part of a timing skew estimation and compensation process for obtaining a broad sampling bandwidth and high signal quality for broadband high-speed communication in a wireless communication system.

Various embodiments may provide a method for enhancing the timing skew estimation performance and compensation performance on the receive end by providing transmission spectrum information from the base station to the UE.

Effects obtainable from various embodiments are not limited to the foregoing, and other unmentioned effects would readily be appreciated by one of ordinary skill in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The foregoing and other objects, features and advantages of the disclosure will be apparent from the following description of embodiments taken in conjunction with the accompanying drawings, in which.

DETAILED DESCRIPTION

Figure 1:
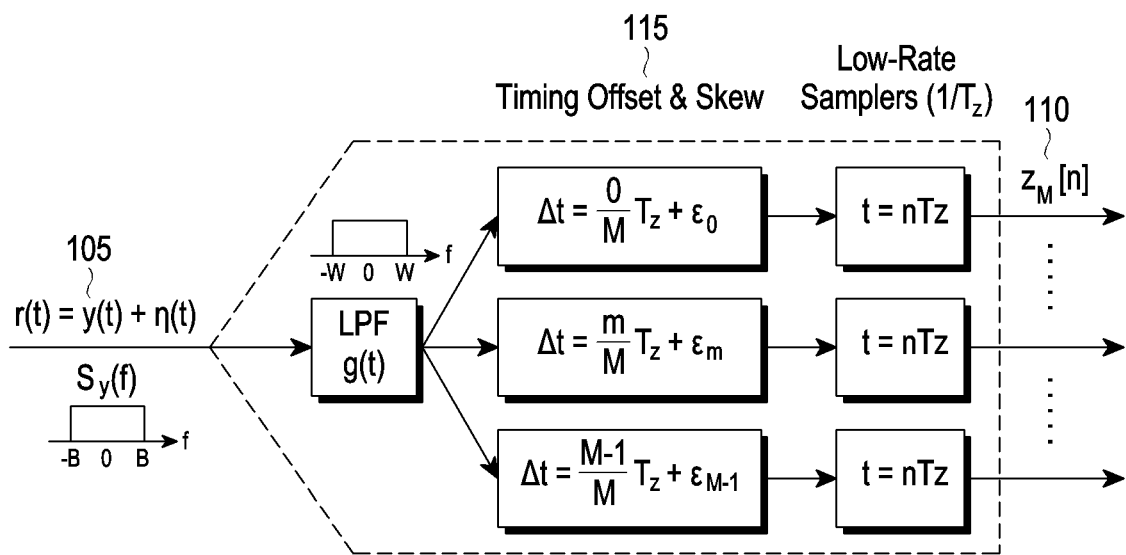
FIG. 1 illustrates a structure of a parallel-structure analog-to-digital converter (ADC) in a wireless communication system according to various embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments are described in detail with reference to the accompanying drawings.

In describing embodiments, the description of technologies that are known in the art and are not directly related to the disclosure is omitted.

This is for further clarifying the gist of the disclosure without making it unclear.

For the same reasons, some elements may be exaggerated, omitted, or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings.

However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A "unit" may be configured in a storage medium that may be addressed or may be configured to reproduce one or more processors. Accordingly, as an example, a "unit" includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the "units" may be combined into smaller numbers of components and "units" or further separated into additional components and "units." Further, the components and "units" may be implemented to execute one or more CPUs in a device or secure multimedia card.

For ease of description, some of the terms or names defined in the 3rd generation partnership project (3GPP) standards (standards for 5G, new radio (NR), long-term evolution (LTE), or similar systems) may be used. The use of these terms, however, does not limit the embodiments by the terms and names, and the embodiments may be applied likewise to systems conforming to other standards, and modifications may be made thereto without departing from the technical spirit of the disclosure.

As used herein to determine whether a specific condition is met or fulfilled, when A is more than B, A may also be not less than B or A may be equal to or more than B and, when A is less than B, A may also be not more than B or A may be equal to or more than B. The expressions "not less than," "not more than," and "not less than and less than" may be replaced with "more than," "less than," and "more than and not more than," respectively.

Hereinafter, in various embodiments, a terminal is described, but the terminal may also be referred to as an electronic device, mobile station, mobile equipment (ME), user equipment (UE), user terminal (UT), subscriber station (SS), wireless device, handheld device, or access terminal (AT). Alternatively, in various embodiments, the UE may be, e.g., a device having communication functionality, such as a mobile phone, a personal digital assistant (PDA), a smart phone, a wireless modem, or a laptop computer.

FIG. 1 illustrates a structure of a parallel-structure analog-to-digital converter (ADC) in a wireless communication system according to various embodiments of the present disclosure.

FIG. 1 illustrates an embodiment of a time interleaved (TI)-ADC. The TI-ADC structure samples the input analog signals in parallel by using a plurality of sub ADCs to obtain a digital signal. In this case, to achieve the target sampling rate and sampling interval, the sub ADCs are in charge of the respective sampling times evenly divided, so that each sub ADC may advantageously achieve ultra-high broadband sampling if a sufficient number of sub ADCs is provided although it operates at a slow sampling rate.

The input analog signal 105 of the TI-ADC may be modeled as the sum of an analog desired signal and an analog thermal noise signal, and the quality of the input signal may be defined as the signal-to-noise ratio (SNR) of the analog signal. The output digital signal 110 of the TI-ADC may be modeled as a vector output being output every sub ADC sampling interval. Ideally, the signal quality of the output signal may be calculated through the sampled digital desired signal and the output digital signal.

If it is ideally calculated and timing skew, which is an error in the sampling time point for each sub ADC, does not occur at all, sampling is possible without deterioration in signal quality. However, in reality, timing skew for each sub ADC randomly occurs due to limitations of the sampling time distribution circuit (115).

When timing skew so occurs, signal quality may be greatly deteriorated according to the ratio for the target sampling interval, and signal quality deterioration increases particularly when the target reception signal quality is higher. Although the reception SNR increases, the SNR of the sampled digital signal may be saturated to a reduced level. Therefore, a method for compensating for this timing skew is required.

According to an embodiment, the number of sub ADCs, the sampling duration of the sub ADC, and the overall sampling rate may be represented as M, TZ, and M/TZ, respectively. The overall sampling rate M/TZ may be set to be larger than or equal to 2 B, which is the required bandwidth of the input signal, and smaller than 2 W, which is the bandwidth of the signal that has passed through the low pass filter. The timing offset vector may be calculated as in Equation 1.

$$\tau_M = [\tau_0, \ldots, \tau_{M-1}]^T \quad \text{[Equation 1]}$$

here, $$\tau_m = \frac{m}{M} T_z + \epsilon_m,$$

and $\epsilon_m$ may be represented as $$\sim \mathcal{U}\left(-\rho\frac{T_z}{M}, \rho\frac{T_z}{M}\right).$$

The output digital signal vector may be calculated as in Equation 2.

$$z_M[n] = [z_0[n], \ldots, z_{M-1}[n]]^T \quad \text{[Equation 2]}$$

here, $z_m[n] = r(nT_z + \tau_m) = y(nT_z + \tau_m) + \eta(nT_z + \tau_m)$.

In the TI-ADC, a digital output signal model by the timing offset having timing skew may be represented as Equation 3.

$$z_m[n] = r(nT_z + \tau_m) = y(nT_z + \tau_m) + \eta(nT_z + \tau_m) \quad \text{[Equation 3]}$$

Here, assuming $M = T_z/T_y$ for $$T_y \leq \frac{1}{2B}$$

and $r_M[n] := [r(nMT_y), \ldots, r(nMT_y + (M-1)T_y)]^T$, it may be summarized as Equation 4

$$z_M[n] = \sum_{k=-\infty}^{\infty} \begin{bmatrix} \text{sinc}\left(kM + \frac{\tau_0}{T_y}\right) & \cdots & \text{sinc}\left(kM + \frac{\tau_0}{T_y} - M + 1\right) \\ \vdots & \ddots & \vdots \\ \text{sinc}\left(kM + \frac{\tau_{M-1}}{T_y}\right) & \cdots & \text{sinc}\left(kM + \frac{\tau_{M-1}}{T_y} - M + 1\right) \end{bmatrix} r_M[n-k] \quad \text{[Equation 4]}$$

$$= \sum_{k=-\infty}^{\infty} G[k](y_M[n-k] + \eta_M[n-k])$$

According to the above calculation, when passing through the TI-ADC, the performance deterioration of the input-to-output SNR and SINR may be represented as Equation 5.

$$SNR = \frac{\sigma_y^2}{\sigma_\eta^2} = \frac{\int_{-B}^{B} S_y(f)df}{\int_{-W}^{W} \frac{N_0}{2}|G(f)|^2 df} = \frac{E_y \cdot 2B}{N_0 \tilde{W}},$$

$$SINR = \frac{\mathbb{E}\|y_M[n]\|}{\mathbb{E}\|z_M[n] - y_M[n]\|^2}$$

In other words, in the performance deterioration of the output gain (SINR/SNR) due to the timing skew, the output SINR may reduce as $\rho$ ≅| increases, and saturation may occur in a high SNR.

Figure 2:
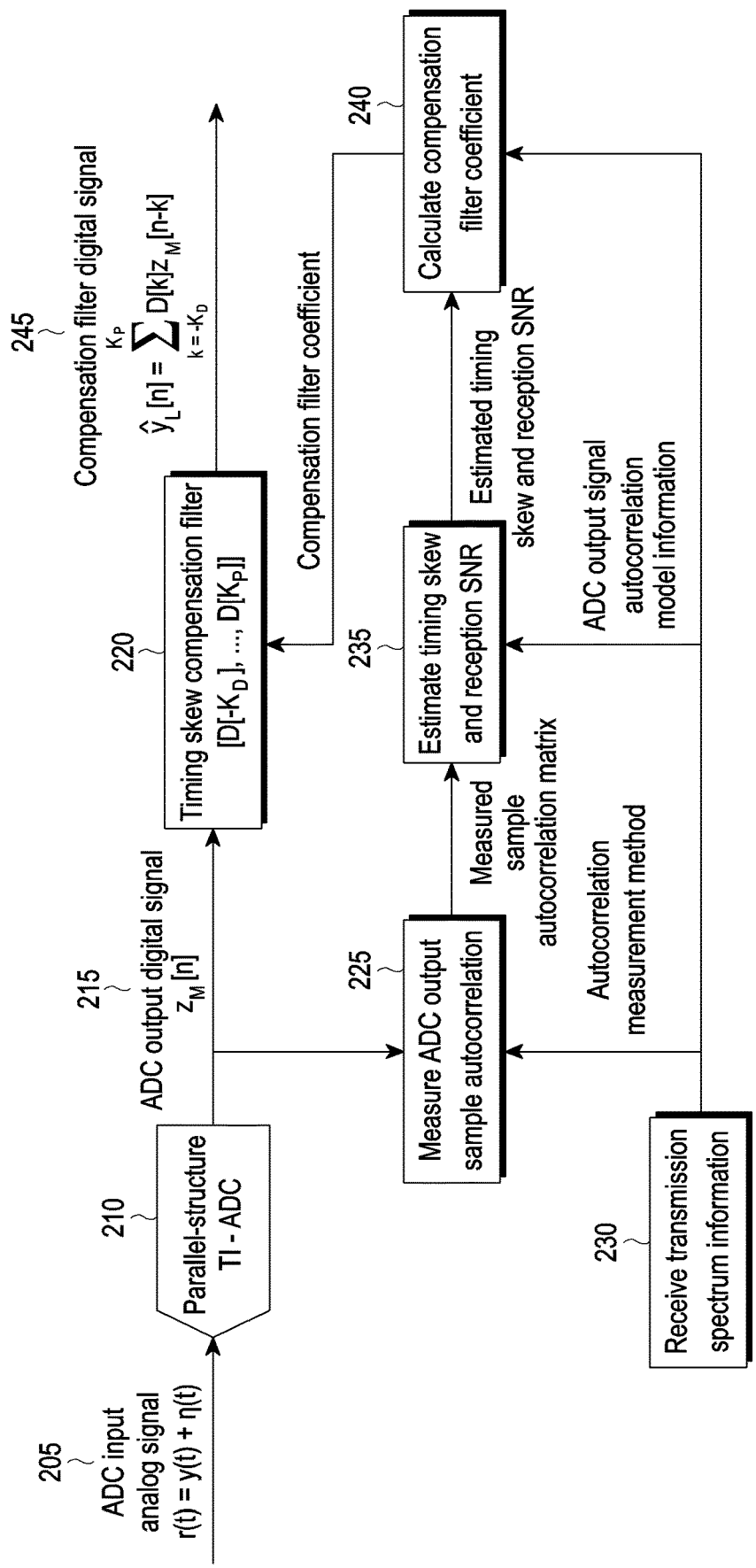
FIG. 2 illustrates a signal processing method performed by a UE according to various embodiments of the present disclosure.

FIG. 2 illustrates a signal processing method performed by a UE (or terminal) according to various embodiments of the present disclosure.

Referring to FIG. 2, upon receiving an analog signal, the UE may input the signal to a parallel-structure time interleaved (TI)-analog to digital converter (ADC) to convert the analog signal into a digital signal (205). The analog signal may be represented as $\gamma(t)=y(t)+\eta(t)$. A series of operations performed by the parallel-structure TI-ADC 210 may include the operations described in connection with FIG. 1. When passing through the parallel-structure TI-ADC 210, the analog signal may be output as a digital signal 215. The digital signal may be represented as $z_M[n]$.

To compensate for timing skew generated while passing through the TI-ADC 210, a timing skew compensation filter 220 may be applied. The timing skew compensation filter 220 has a finite filter length and is applied to digital signals output in parallel from the TI-ADC 210 to compensate for signal distortion due to timing skew. However, to compensate for timing skew, it is necessary to calculate the compensation filter coefficient.

To calculate the compensation filter coefficient, the UE may measure the autocorrelation of the ADC output digital signal 215 (225). Autocorrelation measurement of the ADC output digital signal may be performed to obtain a difference from the autocorrelation matrix modeled in the timing skew and reception SNR estimation step. Therefore, the number of samples or time window for measuring autocorrelation should be performed according to the time-varying characteristics that the modeled autocorrelation matrix may have. In order for the UE to measure autocorrelation, it needs to know a method for measuring autocorrelation. This may be identified by utilizing an autocorrelation measurement method included in the transmission spectrum for the UE received from the base station.

The UE may receive information about the transmission spectrum related to the UE from the base station (230). Information related to the autocorrelation model of the ADC output signal and information about the autocorrelation estimation method are required for calculation of the compensation filter coefficient, timing skew and reception SNR estimation, and ADC output sample autocorrelation measurement by the UE. Since it is difficult for the UE itself to obtain the information, the UE may receive the information from the base station. In general, designing an ADC assumes uniform spectra for the entire target band. However, since the transmission spectrum in the communication system may have time-varying characteristics, and the time variance may increase as the carrier frequency increases to a sub-THz band, the base station providing a communication service may provide as much transmission spectrum information as needed, thereby assisting the UE signal processing of the disclosure in achieving high signal quality.

When aware of the autocorrelation function of the input analog signal, the UE may estimate the autocorrelation matrix of the TI-ADC output signal as a function for timing skew and reception SNR (235). Since the TI-ADC output digital signal may be directly observed by the UE, it is possible to directly calculate the autocorrelation matrix by gathering the output samples. Accordingly, timing skew and reception SNR may be estimated by the estimation method (e.g., maximum likelihood (ML) estimation scheme) for finding the timing skew and reception SNR to minimize the difference between the output sample autocorrelation matrix measured in step 225 and the modeled TI-ADC output autocorrelation matrix included in the transmission spectrum information obtained in step 230. The timing skew and reception SNR value for minimizing the Frobenius norm of the difference between the two matrices of the actually measured autocorrelation matrix and the output autocorrelation matrix model of TI-ADC may be obtained by applying, e.g., a gradient descent method.

A method for designing the optimal filter to maximize the signal quality of the output digital signal of the compensation filter is a minimum mean square error (MMSE) filter and, to calculate the filter coefficient, a cross-correlation matrix coefficient between the TI-ADC output signal and the ideal digital desired signal and the autocorrelation matrix of the TI-ADC output signal may be required. The coefficients of the two matrices for calculating the filter coefficient may require the autocorrelation function (ACF) of the input analog desired signal of the TI-ADC, the autocorrelation function of the analog thermal noise, the reception SNR, and the timing skew vector of the TI-ADC. The UE may calculate the coefficient of the timing skew compensation filter using the timing skew and reception SNR obtained in the prior steps and the transmission spectrum information received from the base station. Among them, the autocorrelation function of the analog thermal noise is determined according to the front-end low pass filter of the TI-ADC, and may thus be identified by the UE.

The UE may apply the obtained compensation filter coefficient to the timing skew compensation filter and output the compensation filter output digital signal (245).

Figure 3:
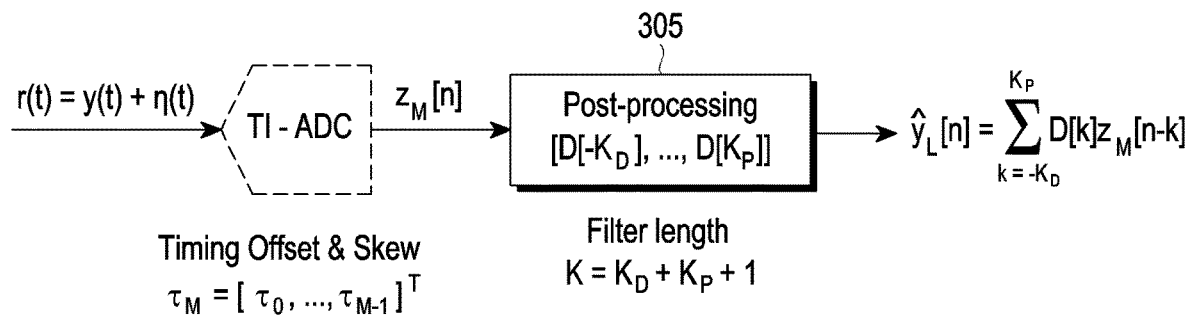
FIG. 3 illustrates a method for compensating for a signal distortion according to various embodiments of the present disclosure.

FIG. 3 illustrates a method for compensating for a signal distortion according to various embodiments of the present disclosure.

Referring to FIG. 3, the parallel-structure TI-ADC of the analog signal, the digital signal passing through the ADC, and a process for generating a compensation filter output digital signal by pre-processing the digital signal may be equationally described. The analog signal may be represented as $r(t)=y(t)+\eta(t)$, and the timing offset and skew in the TI-ADC may be represented as $\tau_M=[\tau_0, \ldots, \tau_{M-1}]^T$. The digital signal $z_M[n]$ that has passed through the ADC may undergo pre-processing 305 of $[D[-K_D], \ldots, D[K_p]]$, and the length of the pre-processing filter may be represented as $K=K_D+K_p+1$. The pre-processed signal may be represented as $$\hat{y}_L[n] = \sum_{k=-K_D}^{K_P} D[k]z_M[n-k].$$

The UE may use Equation 6 to perform coefficient calculation of the minimum mean square error (MMSE) filter in step 240 of FIG. 2.

[Equation 6]

Let $y[n]=y(nT_x)$ and $y_L[n]=[y(nLT_x), \ldots, y(nLT_x+(L-1)T_x)]^T$, then $$e_L[n] = y_L[n] - \sum_{k=-K_D}^{K_P} D[k]z_M[n-k].$$

Here, it may be summarized as Equation 7 using the Wiener-Hopf equation.

[Equation 7]

$$[D[-K_D], \ldots, D[K_p]] =$$

$$[\Gamma_{yz}[-K_D], \ldots, \Gamma_{yz}[K_p]] \begin{bmatrix} \Gamma_{zz}[0] & \ldots & \Gamma_{zz}[K-1] \\ \vdots & \ddots & \vdots \\ \Gamma_{zz}[-K+1] & \ldots & \Gamma_{zz}[0] \end{bmatrix}^{-1}$$

Here, $\Gamma_{yz}[j]:=\mathbb{E}[y_L[n]z_M^H[n-j]]$ and $\Gamma_{zz}[j]:=\mathbb{E}[z_M[n]z_M^H[n-j]]$.

The UE may derive the maximum likelihood (ML)-based estimation scheme available in step 235 of FIG. 2 as follows.

The autocorrelation model and likelihood function of the TI-ADC output signal by the input SNR and timing skew are as shown in Equation 8.

$$\Gamma_{zz}(\beta, \in_{M-1}):=\mathbb{E}[z_M[n]z_M^H[n]] \quad \text{[Equation 8]}$$

Here, the correlation matrix of the output digital signal $z_M[n]$ as the input SNR function may be $\beta:=\sigma_y^2/\sigma_n^2$, and the skew vector may be represented as $\in_{M-1}:=[\in_1, \ldots, \in_{M-1}]^T$. For example, if $y(t)$ of the input signal is white, it may be represented as Equation 9.

$$[\Gamma_{zz}(\beta, \in_{M-1})]_{i,j} = \beta\,\text{sinc}\left(-\frac{\tau_i}{T_x} + \frac{\tau_j}{T_x}\right) + \text{sinc}(2W(-\tau_i + \tau_j)) \quad \text{[Equation 9]}$$

The likelihood function of $z_M[n+q])_{q \in Q}$ may be represented as Equation 10.

$$f(\{z_M[n+q]\}_{q \in Q}|\beta, \in_{M-1}) \approx \prod_{q \in Q} \frac{1}{\det(\pi^M \Gamma_{zz}(\beta, \in_{M-1'}))} \quad \text{[Equation 10]}$$

$$\exp\left(-z_M^H[n+q]\Gamma_{zz}^{-1}(\beta, \in_{M-1'})z_M[n+q]\right)$$

The log likelihood function may be determined as in Equation 11.

$$\ell_{(\beta, \in_{M-1}|\{z_M[n+q]\}_{q \in Q})}:=\ln(f(\{z_M[n+q]\}_{q \in Q}|\beta, \in_{M-1})) \quad \text{[Equation 11]}$$

According to an embodiment, a reception SNR and timing skew estimation method using the sample autocorrelation of the TI-ADC output signal from a point of view of the maximum likelihood may be represented as follows.

The maximum likelihood estimation problem may be represented as Equation 12.

$$\{\hat{\beta}, \hat{\in}_{M-1}\} = \arg\max_{\{\beta, \in_{M-1}\}} \ell(\beta, \in_{M-1}|\{z_M[n+q]\}_{q \in Q}) \quad \text{[Equation 12]}$$

The log likelihood and its partial derivative (c.f., $<A, B>:=\text{tr}(A^TB)$) may be represented as Equation 13.

$$\frac{1}{|Q|}\ell(\beta, \in_{M-1}|\{z_M[n+q]\}_{q \in Q}) = \quad \text{[Equation 13]}$$

$$-M\ln\pi + \ln\left(\det\left(\Gamma_{zz}^{-1}(\beta, \in_{M-1})\right)\right) -$$

$$\frac{1}{|Q|}\sum_{q \in Q} z_M^H[n+q]\Gamma_{zz}^{-1}(\beta, \in_{M-1})z_M[n+q]$$

$$\frac{1}{|Q|}\frac{\partial \ell(\beta, \in_{M-1})}{\partial x} = \frac{1}{|Q|}\left\langle\frac{\partial \ell(\beta, \in_{M-1})}{\partial \Gamma_{zz}^{-1}(\beta, \in_{M-1})}, \frac{\partial \Gamma_{zz}^{-1}(\beta, \in_{M-1})}{\partial x}\right\rangle$$

$$= \left\langle\left[\Gamma_{zz}(\beta, \in_{M-1}) - \frac{1}{|Q|}\sum_{q \in Q} z_M[n+q]z_M^H[n+q]\right]^T, -\Gamma_{zz}^{-1}\right.$$

$$\left.(\beta, \in_{M-1})\frac{\partial \Gamma_{zz}(\beta, \in_{M-1})}{\partial x}\Gamma_{zz}^{-1}(\beta, \in_{M-1})\right\rangle$$

This may be approximated to Equation 14.

$$\{\hat{\beta}, \hat{\in}_{M-1}\} = \quad \text{[Equation 14]}$$

$$\arg\max_{\{\beta, \in_{M-1}\}} \left\|\Gamma_{zz}(\beta, \in_{M-1}) - \frac{1}{|Q|}\sum_{q \in Q} z_M[n+q]z_M^H[n+q]\right\|_F^2$$

Figure 4:
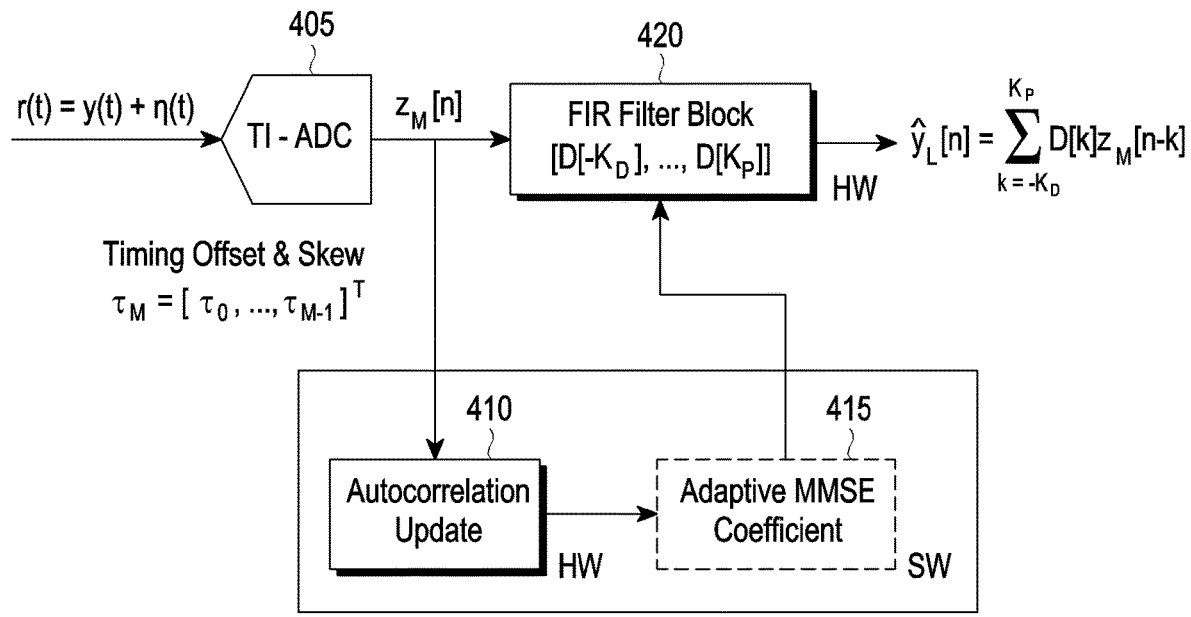
FIG. 4 illustrates a method for compensating for a timing skew according to various embodiments of the present disclosure.

FIG. 4 illustrates a method for compensating for a timing skew according to various embodiments of the present disclosure.

Referring to FIG. 4, the contents of FIGS. 1 to 3 may be applied, and a method for estimating SNR and timing skew using sample autocorrelation and processing the signal of the adaptive MMSE receiver according to the estimation result may be additionally disclosed.

Referring to FIG. 4, the analog signal may be represented as $r(t)=y(t)+\eta(t)$ and be input to the TI-ADC (405). The timing offset and skew in the TI-ADC may be represented as $\tau_M=[\tau_0, \ldots, \tau_{M-1}]^T$. The digital signal $z_M[n]$ that has passed through the ADC may be pre-processed through the FIR filter block of $[D[-K_D], \ldots, D[K_p]]$ (420). However, unlike in FIG. 3, when pre-processing is performed, the autocorrelation may be updated (410) through the ADC output digital signal and the adaptive MMSE coefficient may be calculated (415), and then applied to the pre-processing. The pre-processed signal may be represented as $$\hat{y}_L[n] = \sum_{k=-K_D}^{K_p} D[k]z_M[n-k].$$

According to an embodiment, the autocorrelation update 410 may be represented as Equation 15.

$$\hat{\Gamma}_{zz} = \frac{1}{|Q|}\sum_{q \in Q} z_M[n+q]z_M^H[n+q] \quad \text{[Equation 15]}$$

To calculate the adaptive MMSE coefficient (415), it is necessary to calculate Equation 16.

$$\{\hat{\beta}, \hat{\in}_{M-1}\} = \arg\max_{\{\beta, \in_{M-1}\}} \left\|\Gamma_{zz}(\beta, \in_{M-1}) - \hat{\Gamma}_{zz}\right\|_F^2 \quad \text{[Equation 16]}$$

The process of performing pre-processing 420 through the calculated MMSE coefficient may be represented as Equation 17.

[Equation 17]

$$[D[-K_D], \ldots, D[K_P]] =$$

$$[\hat{r}_{yz}[-K_D], \ldots, \hat{r}_{yz}[K_P]] \begin{bmatrix} \hat{r}_{zz}[0] & \ldots & \hat{r}_{zz}[K-1] \\ \vdots & \ddots & \vdots \\ \hat{r}_{zz}[K-1] & \ldots & \hat{r}_{zz}[0] \end{bmatrix}^{-1}$$

$$\hat{r}_{zz}[k] = \mathbb{E}[z_M[n]z_M^H[n-k]|\hat{\beta}, \hat{\epsilon}_{M-1}], \hat{r}_{yz}[k] = \mathbb{E}[y_L[n]z_M^H[n-k]|\hat{\beta}, \hat{\epsilon}_{M-1}]$$

Figure 5:
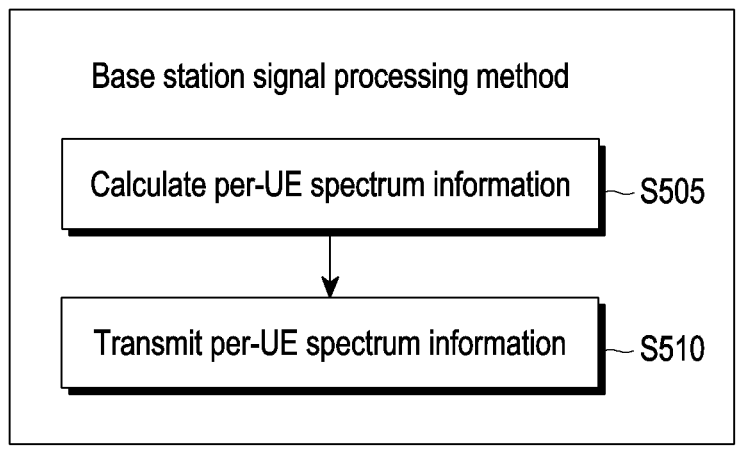
FIG. 5 illustrates a flowchart of operations for signal processing by a base station according to various embodiments of the present disclosure.

FIG. 5 illustrates a flowchart of operations for signal processing by a base station according to various embodiments of the present disclosure.

In the operations of the UE disclosed in FIGS. 1 to 4, the base station may calculate information related to the spectrum for each UE and transfer the information to each UE. In particular, in relation to reception of transmission spectrum information in step 230 of FIG. 2, designing an ADC assumes uniform spectra for the entire target band. However, since the transmission spectrum in the communication system may have time-varying characteristics, and the time variance may increase as the carrier frequency increases to a sub-THz band, the base station providing a communication service may provide as much transmission spectrum information as needed, thereby assisting the UE signal processing of the disclosure in achieving high signal quality.

The base station may calculate transmission spectrum information for each UE (S505). The transmission spectrum information about the UE may have time-varying characteristics in the Sub-THz band. Due to the time-varying characteristics of transmission spectrum information, channels are largely divided according to the positions of the transmission/reception ends and beam formation, so that flexible resource management and time-varying resource allocation may be allowed flexibly, such as carrier bandwidth parts (BWP) of 5G NR. Further, when mobility exists compared to a low band, time variance of frequency selective multipath fading, time-of-arrival (TOA), and direction-of-arrival (DOA) constituting a multi-path channel may be applied to a greater extent.

The transmission spectrum information has time-varying characteristics and the autocorrelation of the reception signal is varied according to the transmission spectrum. Thus, the UE may not previously know the transmission spectrum information. Therefore, the base station needs to transfer the information to the UE. The transmission spectrum information need not be instantaneous information at every moment. If a time window is set to a level where the above time-varying characteristics are sufficiently averaged when a communication service provided to the user (or UE) is given, and transmission spectrum information is collected and transmitted, then the target high signal quality may be obtained according to the signal processing method by the UE. In other words, the base station may set a time window and transmit information about the time window to the UE. If the communication service is changed, collection of the transmission spectrum information needs to be re-performed and transferred to the UE. The UE may use the transmission spectrum information in autocorrelation measurement based on the received time window.

The transmission spectrum information may include frequency resource allocation and waveform information used in the communication service and, based thereupon, the ADC output sample autocorrelation model may be determined in the UE. In other words, the transmission spectrum information may be determined based on the UE's time variance, base station scheduling information and waveform information. Assuming a white transmission spectrum, the sinc function according to the bandwidth may be the autocorrelation model of the ADC output sample. When a general multicarrier OFDM waveform is used, the autocorrelation model may be determined according to at least one of the number of samples per waveform, fast Fourier transform (FFT) size, cyclic prefix (CP) length, multicarrier interval, a number of transmission multicarriers, power distribution per transmission carrier, pulse-shaping filter, and interpolation filter.

According to another embodiment, machine learning-based transmission spectrum information may be collected. In model-based distributed reinforcement learning, a model-based distributed reinforcement learning system based on the above-described bandwidth and autocorrelation model may be configured, and a set of modeled parameters or compressed information or part of the network trained with the information may be provided to the UE.

The base station may transmit the obtained per-UE transmission spectrum information to the UE (S510). As a scheme for transferring information to at least one UE in a radio network, multicasting (many-to-many-of-many association), broadcasting, or unicasting (one-to-one association) may be used. Further, as signaling, in-band signaling which is a signal transfer scheme using the same sub-THz band as the band to be served may be used, or out-band signaling which is a signal transfer scheme using a different frequency band (e.g., an LTE or 3.5 GHz band) from the band to be served may be used. The transmission spectrum information may apply to the ADC output signal autocorrelation model. Further, the UE may apply the transmission spectrum information received from the base station to compensation filter coefficient calculation.

Figure 6:
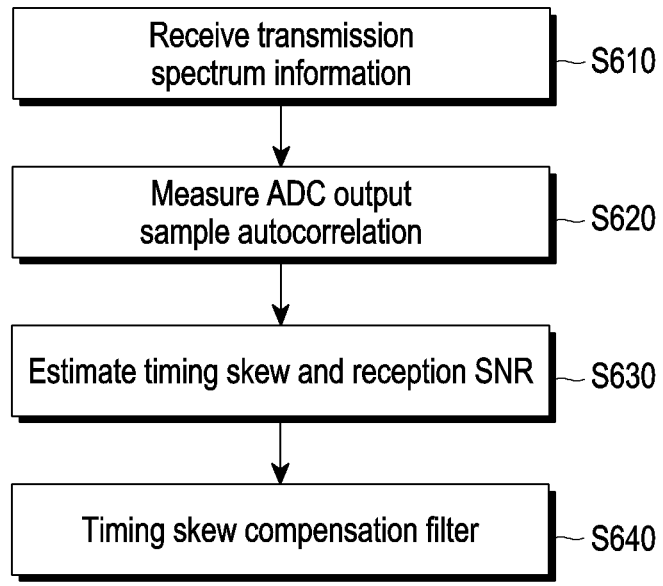
FIG. 6 illustrates a flowchart of operations for signal processing by a UE according to various embodiments of the present disclosure.

FIG. 6 illustrates a flowchart of operations for signal processing by a UE according to various embodiments of the present disclosure. The operations of FIG. 6 may perform the UE operations of FIGS. 1 to 4.

Referring to FIG. 6, the UE may receive transmission spectrum information from the base station (S610). Compensation filter calculation, timing skew and reception SNR estimation, and ADC output sample autocorrelation measurement by the UE may require all of the autocorrelation model of the ADC output signal and the autocorrelation measurement method included in the UE's transmission spectrum information transmitted from the base station. In general, designing an ADC assumes uniform spectra for the entire target band. However, since the transmission spectrum in the communication system may have time-varying characteristics, and the time variance may increase as the carrier frequency increases to a sub-THz band, it is possible to assist the UE signal processing of the disclosure in achieving high signal quality by receiving, from the base station providing a communication service, as much transmission spectrum information as needed.

According to an embodiment, the autocorrelation model of the output signal of the parallel-structure ADC according to the transmission spectrum information may be determined as shown in Equation 18.

$$[\Gamma_{zz}(\beta, \epsilon_{M-1})]_{i,j} = \beta \gamma_y \left(-\frac{\tau_i}{T_x} + \frac{\tau_j}{T_x}\right) + \sigma_\eta^2 \mathrm{sinc}(2W(-\tau_i + \tau_j)) \quad \text{[Equation 18]}$$

Here, the input SNR is $\beta = \sigma_y^2/\sigma_x^2$, and the timing skew is $\epsilon_{M-1}$.

The autocorrelation model according to the sample time interval Tx of the transmission signal in the limited white signal according to the transmission bandwidth information may be represented as Equation 19.

$$\gamma_y(t) = \beta \text{sinc}(t/T_x) \quad \text{[Equation 19]}$$

Further, the autocorrelation model according to the transmission bandwidth $W \leq 1/(2T_s)$ may be represented as Equation 20.

$$\gamma_y(t) = \beta \text{sinc}(2Wt) \quad \text{[Equation 20]}$$

An OFDM-based multicarrier waveform may be included in the transmission spectrum information. The number of digital samples per waveform symbol may be represented as Equation 21.

$$N_{sym} = N_{FFT} + N_{CP} \quad \text{[Equation 21]}$$

Here, $N_{FFT}$ may denote the FFT size, and $N_{CP}$ may denote the cyclic prefix (CP) length.

Further, the multicarrier interval may be represented as F, and the number of transmission multicarriers may be represented as $C(C=[W/F])$. The power distribution for each transmission multicarrier may be represented as Equation 22.

$$\theta_C = [\theta_0, \ldots, \theta_{C-1}]^T, \sum_{c=0}^{C-1} \theta_c = 1. \quad \text{[Equation 22]}$$

In another embodiment, when the pulse-shaping filter is $g_P[n]$, and the interpolation filter is $g_I[n]$, it may be represented as Equation 23.

$$g_P[n] = \max\left(0, 1 - \left|\frac{n}{N_{sym}}\right|\right), g_I(t) = \text{sinc}\left(\frac{t}{T_x}\right). \quad \text{[Equation 23]}$$

The autocorrelation model may be summarized as Equation 24 through the above obtained equations.

$$\gamma_y(t) = \sum_{c=0}^{C-1} \sum_{n=-N_{sym}}^{N_{sym}} \beta \theta_c \cos\left(2\pi \frac{c}{C} n\right) g_P[n] g_I(t - nT_x) \quad \text{[Equation 24]}$$

The UE may measure the autocorrelation of the ADC output sample based on the autocorrelation model (S620). Autocorrelation measurement of the ADC output digital signal may be performed to obtain a difference from the step of estimating the reception SNR and the timing skew generated in the ADC. The number of samples or time window for measuring autocorrelation may be performed according to the time-varying characteristics that the modeled autocorrelation matrix may have.

The UE may estimate the timing skew and reception SNR of the signal based on the measured autocorrelation (S630). Since the TI-ADC output digital signal may be directly observed by the UE, it is possible to directly calculate the autocorrelation matrix by gathering the output samples. Accordingly, timing skew and reception SNR may be estimated by the estimation method (e.g., maximum likelihood (ML) estimation scheme) for finding the timing skew and reception SNR to minimize the difference between the obtained, modeled TI-ADC output autocorrelation matrix and the actually measured output sample autocorrelation matrix. The timing skew and reception SNR value for minimizing the Frobenius norm of the difference between the two matrices of the actually measured autocorrelation matrix and the output autocorrelation matrix model of TI-ADC may be obtained by applying, e.g., a gradient descent method.

Upon estimating the signal timing skew and reception SNR, the UE may apply them to the timing skew compensation filter, compensating for the signal timing skew (S640). The UE may apply the estimated timing skew and reception SNR to the timing skew compensation filter, compensating for signal distortion.

Figure 7:
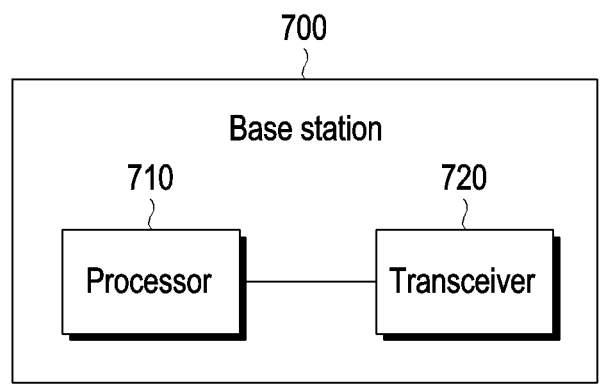
FIG. 7 illustrates a structure of a base station according to various embodiments of the present disclosure.

FIG. 7 illustrates a structure of a base station (BS) 700 according to various embodiments of the present disclosure. Referring to FIG. 7, a BS of the disclosure may include at least one controller (e.g., a processor) 710 and a transceiver 720 including a receiver and a transmitter. The BS may include a memory (not shown). The transceiver 720 and the memory may be connected to the at least one controller 710 to be operated under the control of the at least one controller 710.

At least one controller 710 may control a series of processes so that the operations of the BS in the embodiments of FIGS. 1 to 6 of the disclosure may be performed. At least one controller 710 may include a spectrum information calculator for calculating spectrum information. The transceiver 720 may transmit and receive signals to/from the UE 800 and other network devices. The signals may include control messages and data information.

Figure 8:
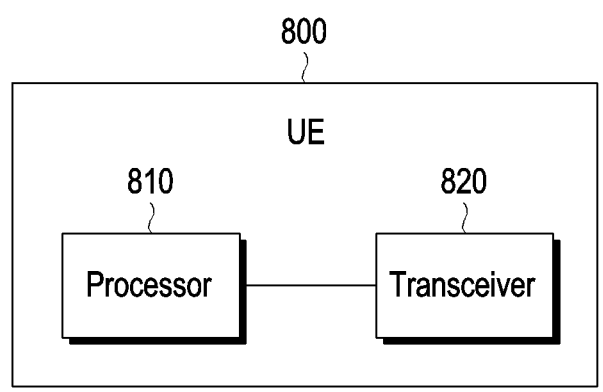
FIG. 8 illustrates a structure of a UE according to various embodiments of the present disclosure.

FIG. 8 illustrates a structure of a UE according to various embodiments of the present disclosure. Referring to FIG. 8, a UE 800 of the disclosure may include at least one controller (or a processor) 810 and a transceiver 820 including a receiver and a transmitter. The UE may include a memory (not shown). The transceiver 820 and the memory may be connected to the at least one controller 810 to be operated under the control of the at least one controller 810.

At least one controller 810 may control a series of processes so that the operations of the UE in the embodiments of FIGS. 1 to 6 of the disclosure may be performed. The at least one controller 810 may include at least one of a parallel-structure ADC, a timing skew compensation filter, a timing skew estimator, a compensation filter coefficient calculator, an ADC output autocorrelation model storage unit, and an ADC output sample autocorrelation measurer, related to the operations of the UE 800 of FIGS. 1 to 6. The transceiver 820 may transmit and receive signals to/from the BS 700 and network devices. The signals may include control information and data.

Figure 9:
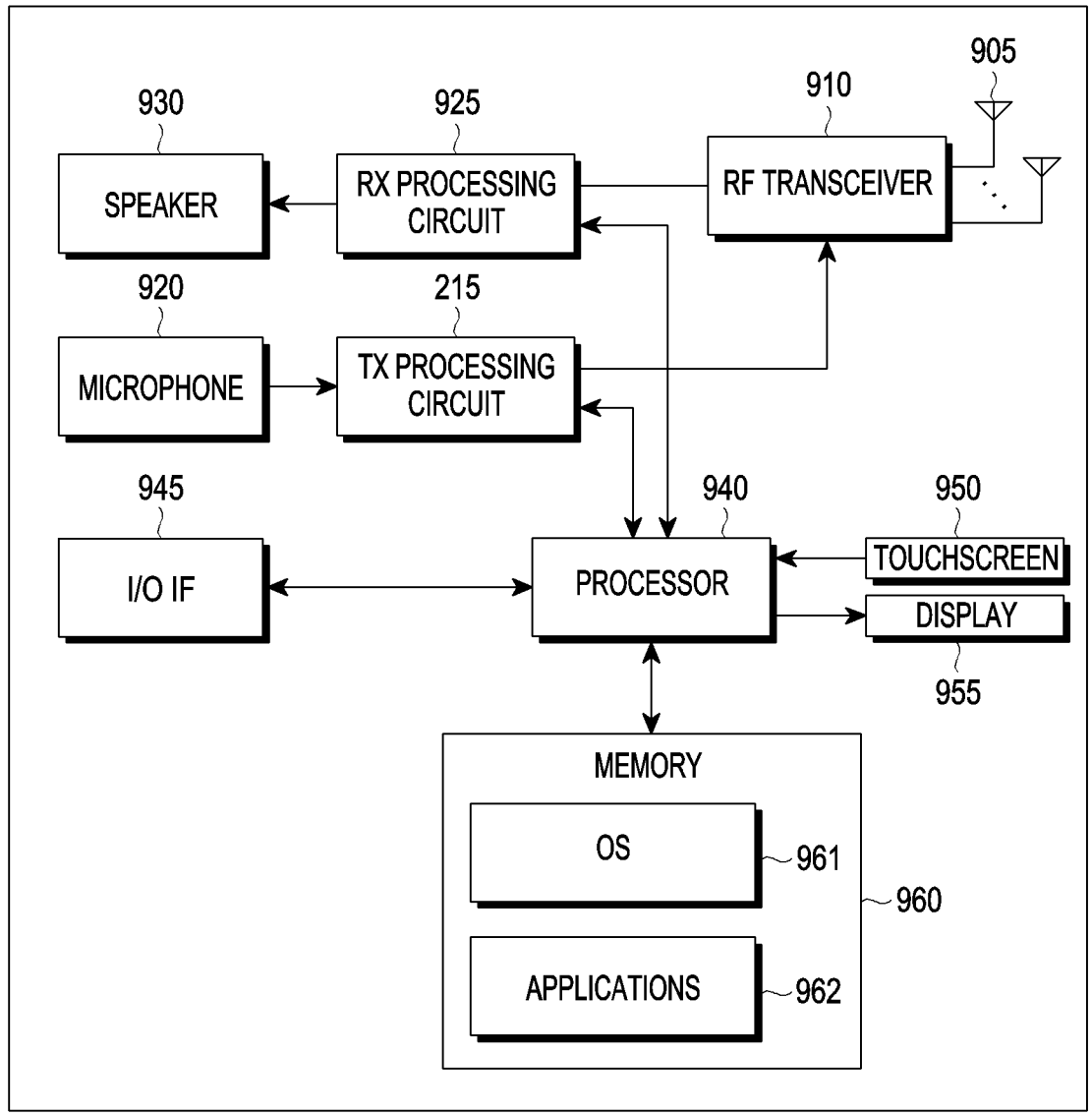
FIG. 9 illustrates another example internal structure of a UE in a wireless communication system according to various embodiments of the present disclosure.

FIG. 9 illustrates another example internal structure of a UE in a wireless communication system according to various embodiments of the present disclosure.

The embodiment of the UE illustrated in FIG. 9 is for illustrative purposes only, and FIG. 9 does not limit the scope of the disclosure to any specific implementation of the UE.

As illustrated in FIG. 9, the UE may include an antenna 905, a radio frequency (RF) transceiver 910, a transmit (TX) processing circuit 915, a microphone 920, and a receive (RX) processing circuit 925. The UE further includes a speaker 930, a processor (controller) 940, an input/output (I/O) interface (IF) 945, a touch screen 950, a display 955, and a memory 960. The memory 960 includes an operating system (OS) 961 and one or more applications 962.

The RF transceiver 910 receives an input RF signal transmitted from a base station in a network, via the antenna 905. The RF transceiver 910 down-converts the input RF signal, generating an intermediate frequency (IF) or baseband signal. The IF or baseband signal is transmitted to the RX processing circuit 925, and the RX processing circuit 925 filters, decodes, and/or digitizes the baseband or IF signal, generating a processed baseband signal. The RX processing circuit 925 sends the processed baseband signal to the speaker 930 (e.g., as for audio data) or the processor 940 (e.g., as for web browsing data) for further processing.

The TX processing circuit 915 receives analog or digital speech data from the microphone 920 or other output baseband data (e.g., web data, emails, or interactive video game data) from the processor 940. The TX processing circuit 915 encodes, multiplexes, and/or digitizes the output baseband data, generating a processed baseband or IF signal. The RF transceiver 910 receives the processed baseband or IF signal output from the TX processing circuit 915 and up-converts the baseband or IF signal into an RF signal which is to be transmitted through the antenna 905.

The processor 940 may include one or more processors or other processing devices, and may execute the OS 961 stored in the memory 960 to control the overall operation of the UE. As an example, the processor 940 may control reception of downlink channel signals and transmission of uplink channel signals by the RF transceiver 910, the RF processing circuit 925, and the TX processing circuit 915 according to known principles. According to an embodiment, the processor 940 includes at least one microprocessor or microcontroller.

In various embodiments, the processor 940 may control the overall operation for managing the UE's network connection and session. In other words, the processor 940 may control the overall operation for managing network connection and session as described with reference to FIGS. 1 to 6, as an example.

The processor 940 may move data into or out of the memory 960 as required by a running process. According to an embodiment, the processor 940 is configured to execute the applications 962 based on the OS program 961 or in response to signals received from base stations or the operator. The processor 940 is coupled to the I/O interface 945, and the I/O interface 945 provides the UE with connectability to other devices, e.g., laptop computers and handheld computers. The I/O interface 945 is a communication path between these accessories and the processor 940.

The processor 940 is also connected to the touch screen 950 and the display unit 955. The operator of the UE may input data into the UE using the touch screen 950. The display 955 may be a liquid crystal display, a light emitting diode display, or other displays capable of rendering text and/or at least limited graphics, such as from websites.

The memory 960 is connected to the processor 940. A portion of the memory 960 may include a random access memory (RAM), and the remainder of the memory 960 may include a flash memory or a read-only memory (ROM).

Although FIG. 9 illustrates an example UE, various changes may be made thereto. For example, various components of FIG. 9 may be combined together, each component may be further divided, or some components may be omitted, or other components may be added as necessary. As an example, the processor 940 may be divided into multiple processors, such as one or more central processing units (CPUs) and one or more graphics processing units (GPUs). Although the UE is configured as a mobile phone or a smart phone in FIG. 9, the UE may be configured to operate as a different type of mobile or stationary device.

In the drawings illustrating methods according to embodiments, the order of description is not necessarily identical to the order of execution, and some operations may be performed in a different order or simultaneously.

Some of the components shown in the drawings illustrating methods of the disclosure may be omitted in such an extent as not to impair the gist or essence of the disclosure.

Although preferred embodiments of the disclosure have been shown and described in connection with the drawings and particular terms have been used, this is to provide a better understanding of the disclosure and is not intended to limit the scope of the disclosure. It is apparent to one of ordinary skill in the art that various changes may be made thereto without departing from the scope of the disclosure.

In other words, although specific embodiments have been described and shown herein, various modifications may be made thereto without departing from the scope of the disclosure, and the scope of the disclosure should not be limited to the embodiments described herein but should rather be determined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   receiving a signal;
   converting the signal into a digital signal;
   receiving, from a base station, transmission spectrum information for the UE and information for a time window;
   estimating a timing skew and a reception signal-to-noise ratio (SNR) of the digital signal based on the information for the time window and the transmission spectrum information; and
   compensating for a distortion of the digital signal based on the estimated timing skew and the reception SNR.

2. The method of claim 1, wherein converting the signal into the digital signal includes converting the signal into the digital signal using a parallel-structure analog-to-digital converter (ADC).

3. The method of claim 1, wherein estimating the timing skew and the reception SNR of the digital signal includes:
   identifying an operation for measuring an autocorrelation and an autocorrelation model based on the transmission spectrum information;
   measuring the autocorrelation of the digital signal based on the operation for measuring the autocorrelation; and
   estimating the timing skew and the reception SNR of the digital signal based on the autocorrelation model and the measured autocorrelation of the digital signal.

4. The method of claim 3, wherein estimating the timing skew and the reception SNR based on the autocorrelation model and the measured autocorrelation of the digital signal includes estimating the timing skew and the reception SNR using a maximum likelihood (ML) estimation scheme or a gradient descent scheme.

5. The method of claim 3, wherein the transmission spectrum information is determined based on at least one of a time variance of the UE, scheduling information, or waveform information for the base station.

6. The method of claim 5, wherein the waveform information includes at least one of a number of samples per waveform, a fast Fourier transform (FFT) size, a cyclic prefix (CP) length, a multicarrier interval, a number of transmission multicarrier, a power distribution per transmission carrier, a pulse-shaping filter, or an interpolation filter.

7. The method of claim 1, wherein compensating for the distortion of the digital signal based on the estimated timing skew and reception SNR includes compensating for the distortion of the digital signal through a timing skew compensation filter, and
wherein the timing skew compensation filter is a filter designed based on a minimum mean square error (MMSE).

8. A method performed by a base station in a wireless communication system, the method comprising:
generating transmission spectrum information for a user equipment (UE);
generating information for a time window for the UE; and
transmitting, to the UE, the time window and the transmission spectrum information,
wherein the information for the time window and the transmission spectrum information are used to estimate a timing skew and a reception signal-to-noise ratio (SNR) of a digital signal, and
wherein the estimated timing skew and the reception SNR are used to compensate for a distortion of the digital signal.

9. The method of claim 8, wherein the transmission spectrum information is determined based on at least one of a mobility of the UE, scheduling information, or waveform information for the base station.

10. The method of claim 9, wherein the waveform information further includes at least one of a number of samples per waveform, a fast Fourier transform (FFT) size, a cyclic prefix (CP) length, a multicarrier interval, a number of transmission multicarrier, a power distribution per transmission carrier, a pulse-shaping filter, or an interpolation filter.

11. A user equipment (UE) in a wireless communication system, the UE comprising:
a transceiver; and
at least one processor operably coupled to the transceiver, the at least one processor configured to:
receive a signal;
convert the signal into a digital signal;
receive, from a base station, transmission spectrum information for the UE and information for a time window;
estimate a timing skew and a reception signal-to-noise ratio (SNR) of the digital signal based on the information for the time window and the transmission spectrum information; and
compensate for a distortion of the digital signal based on the estimated timing skew and the reception SNR.

12. The UE of claim 11, wherein the at least one processor is further configured to convert the signal into the digital signal using a parallel-structure analog-to-digital converter (ADC).

13. The UE of claim 11, wherein the at least one processor is further configured to:
identify an operation for measuring an autocorrelation and an autocorrelation model based on the transmission spectrum information;
measure the autocorrelation of the digital signal based on the operation for measuring the autocorrelation; and
estimate the timing skew and the reception SNR of the digital signal based on the autocorrelation model and the measured autocorrelation of the digital signal.

14. The UE of claim 13, wherein the at least one processor is further configured to estimate the timing skew and the reception SNR using a maximum likelihood (ML) estimation scheme or a gradient descent scheme.

15. The UE of claim 13, wherein the transmission spectrum information is determined based on at least one of a time variance of the UE and scheduling information, or waveform information for the base station.

16. The UE of claim 15, wherein the waveform information includes at least one of a number of samples per waveform, a fast Fourier transform (FFT) size, a cyclic prefix (CP) length, a multicarrier interval, a number of transmission multicarriers, a power distribution per transmission carrier, a pulse-shaping filter, or an interpolation filter.

17. The UE of claim 11, wherein the at least one processor is further configured to compensate for the distortion of the digital signal through a timing skew compensation filter, and
wherein the timing skew compensation filter is a filter designed based on a minimum mean square error (MMSE).

18. A base station in a wireless communication system, the base station comprising:
a transceiver; and
at least one processor operably coupled to the transceiver, the at least one processor configured to:
generate transmission spectrum information for a user equipment (UE),
generate information for a time window for the UE, and
transmit, to the UE, the time window and the transmission spectrum information,
wherein the information for the time window and the transmission spectrum information is used to estimate a timing skew and a reception signal-to-noise ratio (SNR) of a digital signal, and
wherein the estimated timing skew and the reception SNR are used to compensate for a distortion of the digital signal.

19. The base station of claim 18, wherein the transmission spectrum information is determined based on at least one of a mobility of the UE, scheduling information, or waveform information for the base station.

20. The base station of claim 19, wherein the waveform information further includes at least one of a number of samples per waveform, a fast Fourier transform (FFT) size, a cyclic prefix (CP) length, a multicarrier interval, a number of transmission multicarrier, a power distribution per transmission carrier, a pulse-shaping filter, or an interpolation filter.

* * * * *